United States Patent [19]

Phillips

[11] Patent Number: 4,744,640
[45] Date of Patent: May 17, 1988

[54] PLZT MULTI-SHUTTER COLOR ELECTRODE PATTERN

[75] Inventor: James R. Phillips, Albuquerque, N. Mex.

[73] Assignee: Motorola Inc., Schaumburg, Ill.

[21] Appl. No.: 770,560

[22] Filed: Aug. 29, 1985

[51] Int. Cl.⁴ .......................... G02F 1/03; G02F 1/25
[52] U.S. Cl. .................................... 350/388; 350/392; 350/408
[58] Field of Search ............... 350/336, 356, 392, 408, 350/339 F, 388; 358/59, 61; 340/758, 778; 346/108

[56] References Cited

U.S. PATENT DOCUMENTS

| | | | |
|---|---|---|---|
| 3,124,635 | 3/1964 | Jones et al. | 250/578 |
| 3,383,460 | 5/1968 | Pritchard | 350/408 |
| 3,807,831 | 4/1974 | Soref | 350/336 |
| 3,840,695 | 10/1974 | Fischer | 350/392 |
| 3,873,187 | 3/1975 | Brooks | 350/392 |
| 4,086,514 | 4/1978 | Havel | 313/500 |
| 4,170,772 | 10/1979 | Bly | 340/781 |
| 4,343,009 | 8/1982 | Lutz et al. | 346/108 |
| 4,389,095 | 6/1983 | Teshima et al. | 350/336 |
| 4,410,240 | 10/1983 | Medernach | 350/356 |
| 4,458,989 | 7/1984 | Tschang | 350/356 |
| 4,533,217 | 8/1985 | Samek | 350/392 |
| 4,630,040 | 12/1986 | Haertling | 350/388 |
| 4,642,619 | 2/1987 | Togashi | 340/703 |

FOREIGN PATENT DOCUMENTS

| | | | |
|---|---|---|---|
| 36259 | 4/1978 | Japan | 340/774 |
| 1534027 | 11/1978 | United Kingdom | 350/392 |
| 2024443 | 1/1980 | United Kingdom | 350/339 F |

OTHER PUBLICATIONS

Braen et al, "AC Plasma Display Panel with Shield Plane", IBM Tech. Disc. Bull., 12—1977, pp. 2891–2894.

Primary Examiner—William H. Punter
Attorney, Agent, or Firm—Edward M. Roney; Donald B. Southard

[57] ABSTRACT

An electro-optic display having either variable-color or selectable-color capability is disclosed, with each having particularly efficient electrode patterns for achieving color control. Each implements a passive display utilizing an electro-optic material such as PLZT having one of these types of electrode patterns and aligned with an appropriate multi-colored filter. By applying D.C. control voltages to these sets of electrodes, which are sufficiently small to form unit cells, variable or selectable color is perceived. The patterns may be arranged in a sequence of any length or width, with the three-shutter pattern featuring no surface-mounted crossovers.

12 Claims, 3 Drawing Sheets

□ RED  ▨ BLUE  ▧ GREEN

PLZT MULTI-SHUTTER COLOR ELECTRODE PATTERN

BACKGROUND OF THE INVENTION

The present invention generally relates to electronic displays and, more particularly, to an electrode pattern for a variable-color electro-optic display. The electrode pattern of the present invention consists of multiple sets of electrodes formed into unit cells which are arranged in a sequence and connected in parallel fashion without the need for surface-mounted crossovers.

Color display devices are undergoing an evolution to achieve smaller size and lower power consumption while striving to retain the variable color and resolution qualities of the old CRT (cathode ray tube) technology. One rather new material that is seeing increasing use in color display devices is PLZT (lead, lanthanum, zirconium titanate). This material, having unique physical properties with respect to the passage of light, is capable of electrically controlling either its birefringent (or double-refraction) effect on light to produce color, or its light transmission properties to create an electronic shutter. This is because the optical properties of the material are dependent on an applied electric field, and the electrodes provide the means to individually control the optical properties of locally small areas, or unit cells, of the bulk material. Depending on which effect is desired, as well as the type of information to be displayed, determines how the electrode pattern is implemented and controlled.

Several implementations of solid-state electronic displays are known. A known first implementation utilizing the on-off properties of PLZT incorporates conductors placed into parallel cuts in the material to provide a light shutter. However, while this implementation recognizes that the PLZT may be used for providing a differential phase retarcation and hence implies voltage-variable color, the implementation explicitly discloses the use of PLZT only as a light switch. Moreover, the fabrication process is costly and time-consuming.

A known second implementation utilizing semiconductor technology produces variable color in an active display. This implementation uses a three-dimensional electrode arrangement to control three semiconductor light emitting diode areas for effecting an emissive variable-color display. However, this is distinguishable from the passive approach of the present invention.

A known third implementation first produces color in an active section of a display and then utilizes the birefringent properties of PLZT in a passive section to control the display of variable color. However, this arrangement utilizes dual sets of electrodes mounted on both surfaces to achieve full color variability. Moreover, a single set of electrodes mounted on one surface would have limited color variability.

Thus each of these known prior art implementations falls short of achieving a truly variable passive color display, capable of saturated color, while having a simplified electrode pattern.

Accordingly, there exists a need for further improvement in the implementation of a variable-color PLZT display such that it is truly variable and capable of saturated color while having a simplified electrode pattern which is repeatable without requiring surface-mounted crossovers.

SUMMARY OF THE INVENTION

It is an object of the present invention to provide a variable-color PLZT display which overcomes the foregoing deficiencies It is a further object of the present invention to provide a variable-color PLZT display of the foregoing type which utilizes eye integration or blending of a combination of three primary colors for providing any desired color and which is capable of saturated color, while having a simplified electrode pattern that does not require surface-mounted crossovers It is also a further object of the present invention to provide a selectable-color PLZT display similar to the foregoing type which utilizes eye integration or blending of the combination of two primary colors for providing a third predetermined color and which is capable of saturated color, while having a simplified electrode pattern that does not require surface-mounted crossovers.

In practicing the invention, an improved, variable-color PLZT display electrode pattern is provided in an arrangement which aligns a configuration of electrodes with a multi-colored filter. In one embodiment of the present invention, the arrangement consist of groups of unit cells controlling groups of triple light paths. With sufficiently small unit cells, eye integration allows the blending of any combination of the three primary colors to be perceived as any single desired color.

In a second embodiment of the present invention, the arrangement consists of groups of unit cells controlling groups of dual light paths. In this case, similar to the one before, the small unit cells allow eye integration or blending of the combination of two primary colors to be perceived as a single predetermined third color. In each of these embodiments, the significant feature is that the variable and selectable color, respectively, including saturated color, is accomplished by the use of a multicolor filter and a particularly efficient electrode pattern for achieving color control These and other objects of the present invention will become apparent to those skilled in the art upon consideration of the accompanying specification, claims, and drawings.

BRIEF DESCRIPTION OF THE DRAWINGS

Referring to drawings, wherein like reference numerals identify like elements in the several figures and in which.

DETAILED DEESCRIPTION OF THE PREFERRED EMBODIMENT

Figure 1A:
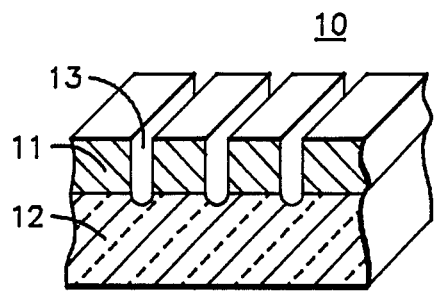
FIG. 1A is a pictorial representation of a prior art implementation of a light shutter utilizing conductors placed into parallel cuts in an electro-optic material.

Referring now to the drawings, an electronic shutter electrode arrangment for effecting a PLZT light modulator is shown at 10 in FIG. 1A. The PLZT material 11 is mounted to an optically transparent substrate 12 such as glass or fused quartz and has a plurality of cuts in which a suitable conductive material 13 is placed. These electrodes establish a uniform electric field through the PLZT material 11, but are more costly and time-consuming to fabricate. Moreover, this prior art implementation only discloses the use of PLZT as a light switch, although it does recognize that PLZT may be used for providing a differential phase retardation, and hence voltage-variable color is only merely implied.

Figure 1B:
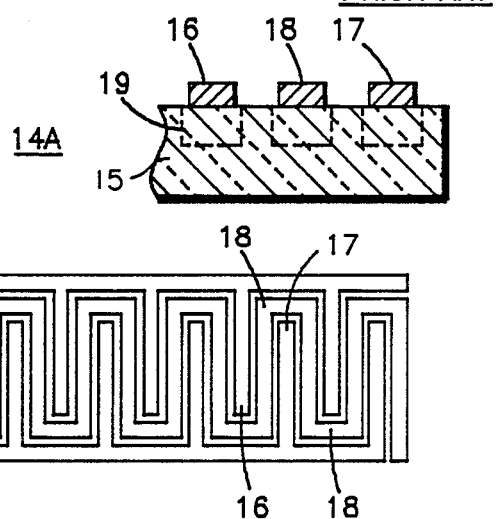
FIG. 1B is a pictorial representation of a prior art implementation of an emissive variable color display device using semiconductor light emitting diodes controlled by a three-dimensional electrode arrangement.

A known second implementation of prior art is given by side view 14a and top view 14b of FIG. 1B. In this implementation, a block of semiconductor material 15 has a pattern of electrodes consisting of 16, 17, and 18 making contact to the respectively diffused areas beneath designated 19. Each area forms a light emitting diode (LED) and shares a common return lead connected to the bulk semiconductor material 15 in a three dimensional connection arrangement. Thus an active, light-producing display having three independently-controlled colors is shown. However, the main disadvantages of this display are poor readability in sunlight, limited resolution, and high power drain and cost of manufacture, especially for large displays.

Figure 1C:
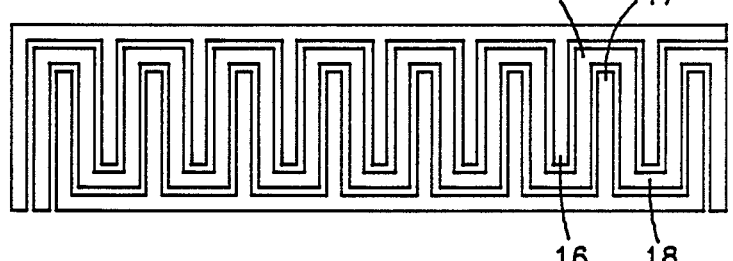
FIG. 1C is a pictorial representation of a prior art implementation of a variable color display device having an active, colored-light producing section and a passive PLZT section with birefringent control providing a variable-color display through utilization of an elaborate electrode arrangement.
Figure 1C:
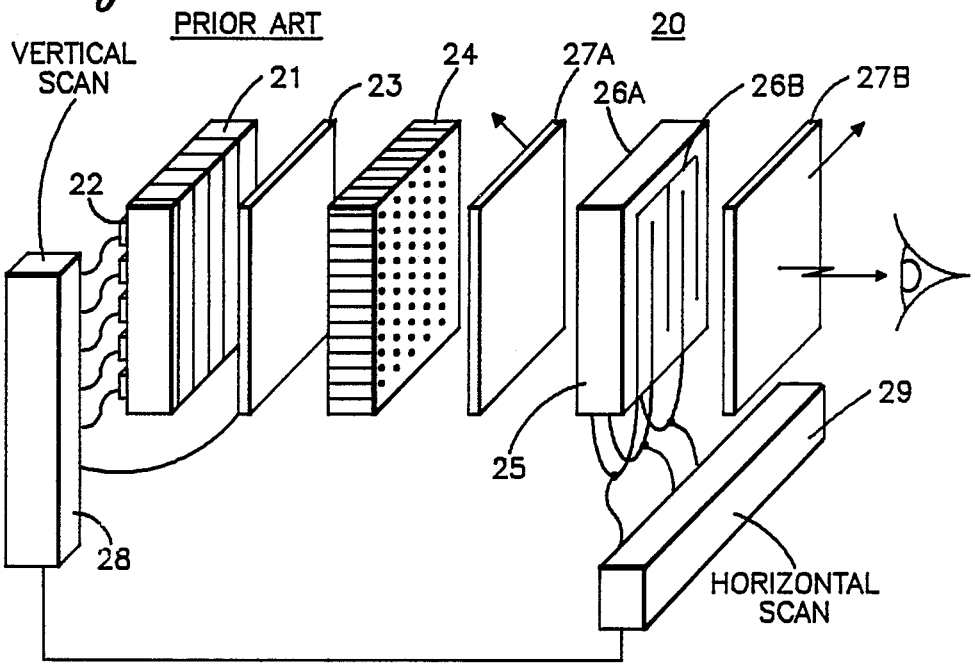

A known third implementation of prior art is given by the apparatus 20 shown in FIG. 1C. In this implementation, a combination of both an active, light-producing section and a passive, light-modulating section is shown. The active section consists of vertical, tri-color phosphor strips 21 sandwiched between a grouping of horizontal striped electrodes 22 and a common transparent electrode 23. Next is fiber optic plate 24, followed by the passive section consisting of electro-optic material 25 having vertical interdigital surface electrodes 26a, 26b and sandwiched between two orthogional dichroic polarizers 27A, 27B. Such an arrangement is, while providing a variable-color display, (via scanning control circuitry 28, 29) overly complex and incapable of saturated color.

This, each of the prior art PLZT display arrangements 10 and 20 are subject to one or more of the previously enumerated deficiencies set forth with some particularity in the background of the invention. That is, they are incapable of varying over the full color range or are incapable of saturated color, or both.

Furthermore, the prior art arrangement of 14, utilizing a completely different technology to effect an active display using semiconductor LEDs, suffers from the disadvantages of poor readability in sunlight, limited resolution, and high power drain and cost of manufacture as a result. Moreover, the electrode pattern is part of a three-dimensional connection arrangement for supplying current to the underlying LEDs and is not an electric field influenced device.

Figure 2A:
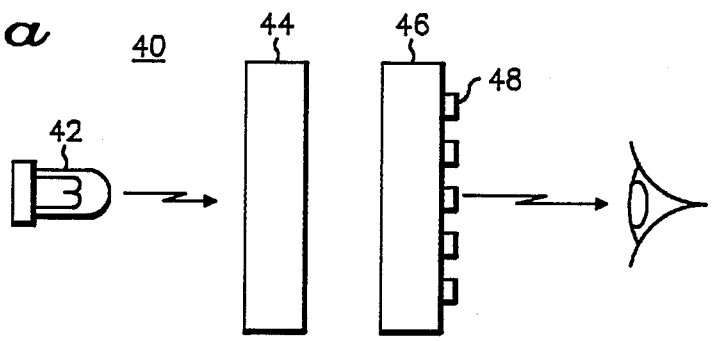
FIG. 2A is a pictorial representation of one embodiment having the illumination source, color filter, and PLZT electronic shutter aligned for controlling one or more paths of light in accordance with the transmissive mode of the present invention.

In one preferred embodiment of the variable color PLZT display of the present invention depicted at 40 is shown in FIG. 2A. In this embodiment as depicted at 40, the transmissive mode is shown, which begins with illumination source 42 producing white light containing all wavelengths of visible light. The light encounters a filter 44, which consists of a plurality of multi-colored filter elements. Next, the filtered, multi-color light beams are presented to the electro-optic material 46 having a pattern of electrodes 48 suitably aligned with the multi-color elements of filter 44. By application of suitable control voltages to the electrode 48, which may be either opaque or translucent, electric fields are established which the control the intensity of the multi-color light beams to effect a desired color.

Figure 2B:
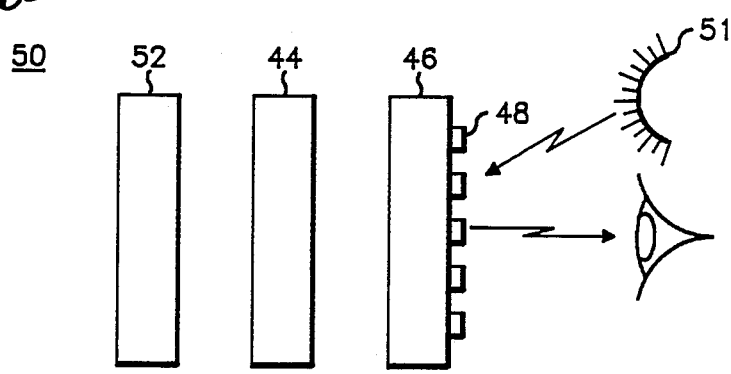
FIG. 2B is a pictorial representation of another embodiment showing the placement of a reflector for controlling one or more paths of light in accordance with the reflective mode of the present invention.

Similarly, an alternate embodiment of the present invention depicted at 50 is shown in FIG. 2B. Here, instead of an illumination source, an ambient light source 51 is utilized, together with reflector 52. The resultant desired color is similarly perceived, although the light path length in this reflective mode is double what it was in the transmissive mode of preferred embodiment 40.

Figure 2C:
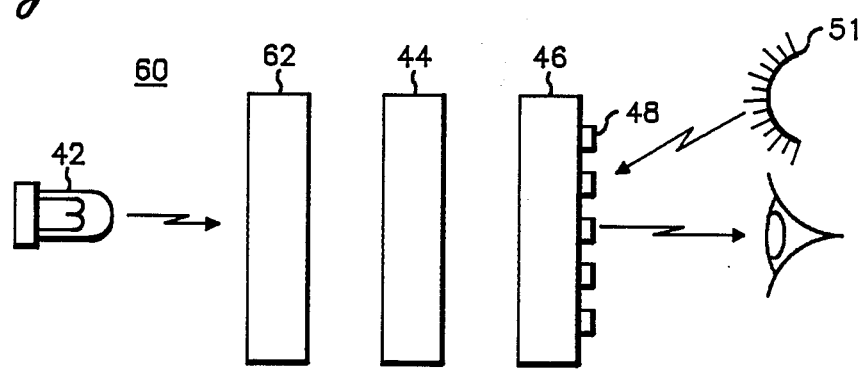
FIG. 2C is a pictorial representation of still another embodiment showing the utilization of a partial reflector for controlling one or more paths of light in accordance with the transflective (i.e., transmissive and reflective) mode of the present invention.

Additionally, still another embodiment of the present invention combining each of the above modes is depicted at 60 in FIG. 2C. In this arrangement, illumination source 42 together with ambient light 51 are combined utilizing partial reflector 62 in a transmissive and reflective mode, hereinafter referred to as transflective. It will be understood that the electro-optic material 46 in the embodiments in situated between polarizers (not shown).

Figure 3:
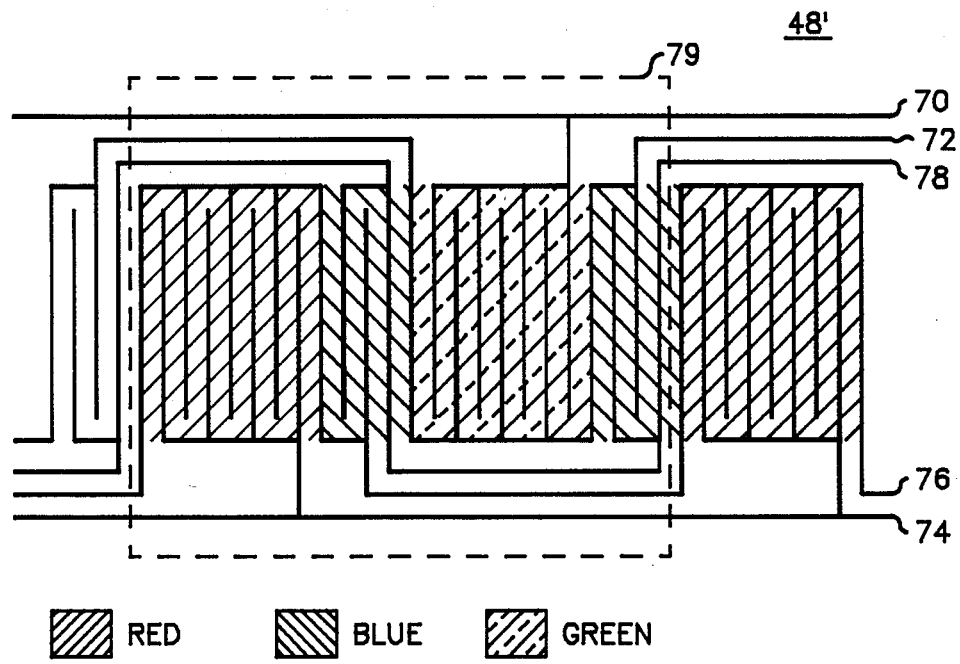
FIG. 3 is a pictorial schematic representation of the three shutter electrode pattern in accordance with the present invention.

Each of these arrangements utilize the multi-color shutter electrode patterns of the present invention to effect a passive display. In FIG. 3, a preferred embodiment of the three shutter electrode pattern is depicted at 48' having translucent electrodes made of tin oxide. It consists of a first set of interdigitated electrodes having a first active lead 70, and a first common lead 72 alternately interleaved with a second set of interdigitated electrodes having a second active lead 74, and a second common lead 76. In serpentine fashion between the interleaved first and second sets is a third active lead 78 which is interdigitated with common leads 72 and 76. This pattern forms a unit cell 79 occuring in a sequence which provides a plurality of like sets of electrodes in parallel fashion without requiring surface-mounted crossovers.

Figure 4:
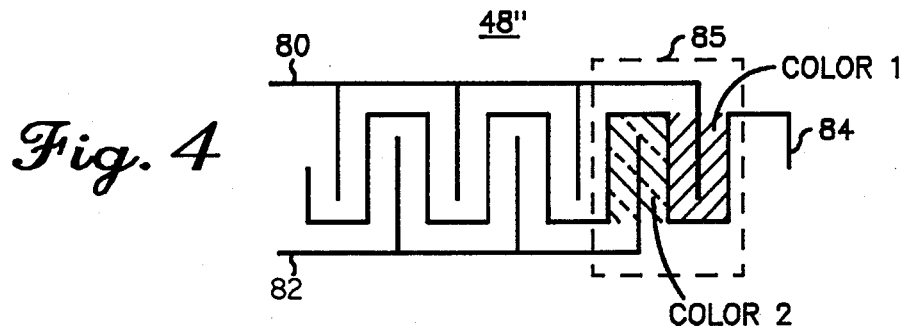
FIG. 4 is a pictorial schematic representation of the two shutter electrode pattern in accordance with the present invention.

In FIG. 4 is a preferred embodiment of the two shutter electrode pattern is depicted at 48''. It consists of a first and second active electrode 80, 82 alternately interleaved and sharing a common interdigitated lead 84 which is interposed between active electrodes 80, 82 in a serpentine fashion. This pattern forms a unit cell 85 occuring in a sequence while providing a plurality of like sets of electrodes in parallel fashion.

Figure 5:
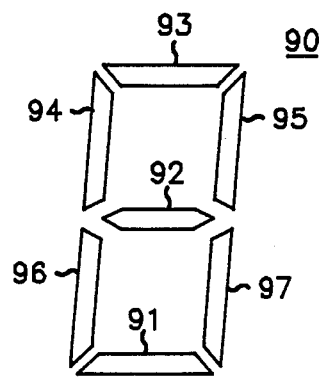
FIG. 5 is one possible display arrangement shown in a frontal view which utilizes segments consisting of linear extensions of the above-disclosed electrode patterns to form a numeric display.

A typical arrangement of display segments are shown in 90 in FIG. 5. By constructing a line segment 91 which is an extended version of the disclosed unit cell pattern 79 of FIG. 3 or 85 of FIG. 4, the desired length and width can be achieved. Then, arranging such segments 92-97 as shown, a segmented display can be configured.

Although the multi-color shutter electrode patterns of the present invention in conjunction with the overall display operational diagrams fully disclose many of the intended advantages, it is understood that various changes and modifications are apparent to those skilled in the art. Therefore, even though the forms of the above-described invention are merely preferred or exemplary embodiments, variations may be made in the form, construction, and arrangement of these electrode patterns without departing from the scope of the above invention.

What is claimed is:

1. An improved, electronic shutter arrangement having an electrode pattern for controlling a plurality of light paths passing through an electro-optic substrate and forming a plurality of sequentially positioned unit cells, comprising in combination:
   electro-optic substrate means responsive to an electric field established between a set of electrodes mounted thereon;
   a first set of electrodes having a first active and a first common lead for establishing a first electric field;
   a second set of electrodes having a second active and a second common lead for establishing a second electric field, with said second set interleaved with said first set; and
   a third set of electrodes having two parts formed by a third active lead interposed in serpentine fashion between said first and second sets of electrodes for establishing a third electric field and interdigitated with said first and second common leads thereof,
   said first, second, and third sets of electrodes cooperating to form unit cells in positional sequence and wherein each unit cell provides selectively controlled individual light paths having sets of electrodes positionally related to one another without surface-mounted crossovers.

2. An improved, electronic shutter electrode arrangement according to claim 1, wherein said light paths correspond to three primary colors formed by an aligned, multi-colored filter and wherein said unit cell is sufficiently small so that a blending of any combination of said three primary colors effects the display of any desired, continuously variable, potentially saturated color.

3. An improved, electronic shutter electrode arrangement according to claim 1, wherein said electro-optic substrate means comprises material of lead, lanthanum, zirconium titanate (PLZT).

4. An improved, electronic shutter electrode arrangement according to claim 1, wherein said sets of electrodes comprise transparent electrodes.

5. An improved, electronic shutter electrode arrangement according to claim 4, wherein said transparent electrodes comprise a material such as tin oxide.

6. An improved, electronic shutter electrode arrangement according to claim 1, wherein said sets of electrodes comprise opaque electrodes.

7. An improved, electronic shutter electrode arrangement according to claim 1, wherein said sets of electrodes are formed into a line segment having a predetermined length and width as part of a segmented alphanumeric display.

8. An improved, electronic shutter electrode arrangement according to claim 1, wherein said light paths comprise light eminating trom a source of back light located oppositely from a given viewing surface so as to be transmissive through said electro-optic substrate.

9. An improved, electronic shutter electrode arrangement according to claim 1, wherein said light paths comprise light from an ambient source located on the same side as a given viewing surface and having an appropriately reflective back element so as to effect reflective return of said ambient source light through said electro-optic substrate.

10. An improved, electronic shutter electrode arrangement according to claim 1, wherein said light paths comprise light from an ambient source located on the same side as a given viewing surface in addition to an oppositely located source of back light and having an appropriate partially reflective back element so as to effect transflective passages of light through said electro-optic substrate.

11. An improved, color display apparatus having an electrode pattern for controlling a plurality of triple color light beams formed by an aligned, triple-colored filter and passing through an electro-optic substrate for forming a plurality of sequentially positioned unit cells, comprising in combination:
   an electro-optic material such as lead, lanthanum, zirconium titanate (PLZT) responsive to an electric field establishec between a set of electrodes mounted thereon;
   a first set of electrodes having a first active and a first common lead for establishing a first electric field;
   a second set of electrodes having a second active and a second common lead for establishing a second electric field, said second set interleaved with said first set; and
   a third set of electrodes having two parts formed by a third active lead interposed in serpentine fashion between said first and second set of electrodes for establishing a third electric field and interdigitated with said first and second common leads thereof,
   said first, second, and third sets of electrodes cooperating to form unit cells in positional sequence wherein each unit cell provides selectively controlled individual light paths having sets of electrodes positionally related to one another without surface-mounted crossovers, and wherein said unit cell is sufficiently small so that a blending of any combination of said three primary colors effects the display of any desired, continuously variable, potentially saturated color.

12. An improved, color display apparatus having an electrode pattern for controlling a plurality of triple color light beams formed by an aligned, triple-colored filter and passing through an electro-optic substrate for forming a plurality of sequentially positioned unit cells, comprising in combination:
   an electro-optic material such as lead, lanthanum, zirconium titanate (PLZT) responsive to an electric field established between a set of planar interdigitated electrodes mounted thereon;
   a first set of interdigitated electrodes having a first active and a first common lead for establishing a first electric field;
   a second set of interdigitated electrodes having a second active and a second common lead for establishing a second electric field, said second set interleaved with said first set; and a third set of interdigitated electrodes having two parts formed by a third active lead interposed in serpentine fashion between said first and second set of electrodes for establishing a third electric field and interdigitated with said first and second common leads thereof, said first, second, and third set of interdigitated electrodes cooperating to form unit cells in positional sequence wherein each unit cell provides selectively controlled individual light paths having sets of interdigitated electrodes positionally related to one another without surface-mounted crossovers, and wherein said unit cell is sufficiently small so that a blending of any combination of said three primary colors effects the display of any desired, continously variable, potentially saturated color.

* * * * *